L. DORMAN.

Wheels for Vehicles.

No. 5,509. Reissued July 29, 1873.

Witnesses:

A. W. Almqvist

C. Sedgwick

Inventor:

L. Dorman

Per

Attorneys.

AM. PHOTO-LITHOGRAPHIC CO. N.Y. (OSBORNE'S PROCESS.)

UNITED STATES PATENT OFFICE

LATHROP DORMAN, OF WILLIMANTIC, CONNECTICUT, ASSIGNOR TO CHARLES W. FILLMORE AND JOHN R. MINER.

IMPROVEMENT IN WHEELS FOR VEHICLES.

Specification forming part of Letters Patent No. 64,955, dated May 21, 1867; reissue No. 5,509, dated July 29, 1873; application filed April 19, 1873.

*To all whom it may concern:*

Be it known that I, LATHROP DORMAN, of Willimantic, in the county of Windham and State of Connecticut, have invented a new and useful Improvement in Carriage-Wheel Hubs, of which the following is a specification:

The object of my invention is to provide a combined metal and wood hub, which obviates the well-known disadvantages of carriage-hubs constructed entirely of either wood or metal. My invention consists of a combined grooved wooden hub or center, an outer mortised metallic shell and spokes, the latter passing through the metal mortises into the groove in the wooden part and wedging together, and with the walls of the groove at the inner ends.

Figure 1:
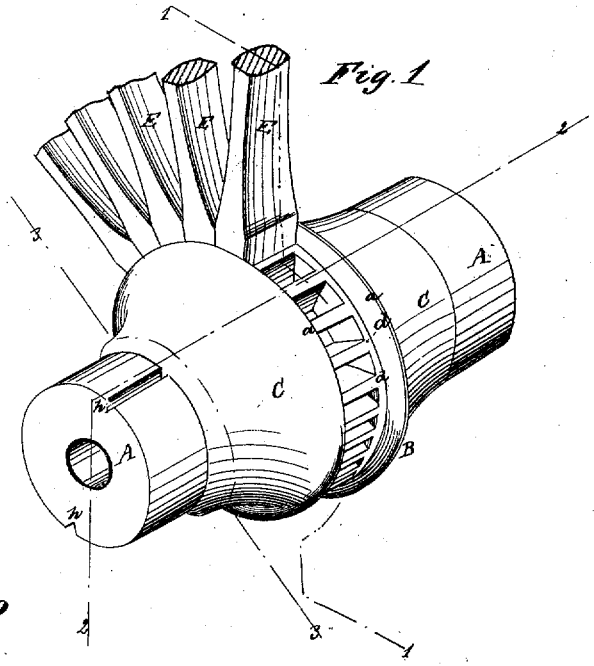
Figure 2:
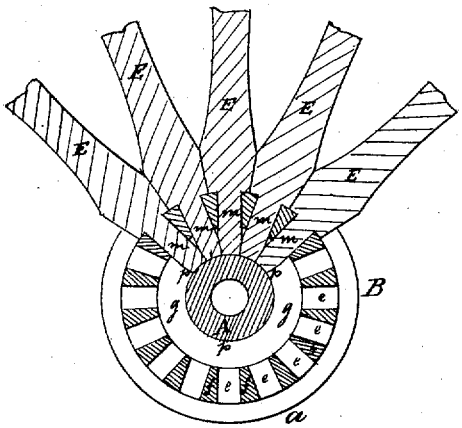
Figure 3:
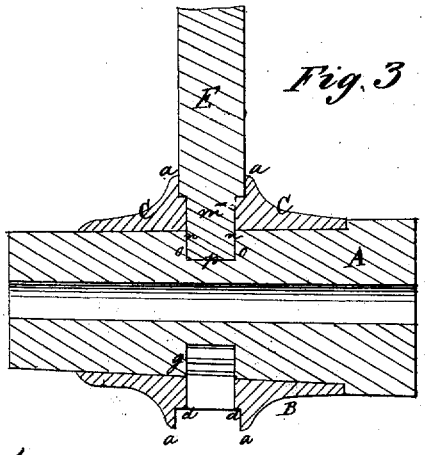
Figure 4:
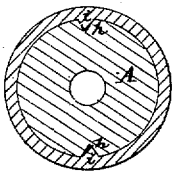

Figure 1 is a perspective view of so much of the hub as is necessary to illustrate the invention. Fig. 2 is a sectional elevation upon line 1, Fig. 1. Fig. 3 is a sectional elevation upon line 2 2, Fig. 1. Fig. 4 is a sectional elevation upon line 3 3, Fig. 1.

Similar letters of reference indicate corresponding parts.

Referring to the drawing, A is the center part of the hub, made of wood. B is the metallic mortised shell, made to fit snugly around the wood center. C C represent the portions of mortise shell B that extend each way from the spokes toward the ends of the hub. *a a* are flanges, which project up by the front and hind sides of the spokes F a greater or less distance relatively to the depth of the mortises *e e*, the ends of which and these projections *a a* support the spokes. *d d* are shoulders upon shell B, at the base of the flanges. Their width is governed by the width of the bottom of mortises *e e*, the object being to insure a practical width and lateral strength to the spokes. *f f* are the partitions connecting the front and back parts of the shell B, and separating the mortises in the same. Care must be taken to have these partitions so arranged that the sides of the spokes will meet and wedge together sidewise. The wood part A is grooved out at one or more places, *h*, Fig. 4, to receive the pins *i* on shell B, rendering it impossible for the wood A to turn in the shell. A groove, *g*, is turned out in wood part A, of the same width as the mortises *e e*, and to a depth sufficient, in conjunction with metal mortises *e e*, to firmly hold the spokes in their place, and at the same time leave a sufficient thickness of wood at the bottom of the groove, or between the base of the spoke and axle-box hole, to support the extreme center of hub.

The wheel is put together as follows: The metal-mortise shell B is driven or pressed over the wood A. The spokes E are then driven in so as to occupy the relative positions as described and shown in the drawing. It will be seen that the spokes E must fill the mortises *e e*, while their edges *n n* must press against the sides *o o* of groove *a*, and their sides against each other, so as to form a solid belt of spokes, wedging firmly in the groove *g*. The extent which they are to rest against each other outside of mortises *e e* is controlled entirely by the depth and width of the metal mortises *e e*.

As a further means of wedging the spokes firmly in the grooves, the sides *g* will be turned out wider at the bottom, so as to make the groove in dovetail form, and the ends or tenons *m* will be split and fitted with small wedges before they are put in, so that when driven in the wedges will strike against the bottom of the groove *g*, and thus force the tenons apart sufficiently to fill the enlarged bottom of the groove.

I am aware of the invention described in the English patent of Smith and Parfrey, dated May 10, 1853; but in that the metal bars which pass between the spokes, being double, practically limit the extent to which the spokes can be enlarged in the direction of each other outside of the metal; besides, the double bar necessarily leaves the front and back portions of the metal of an uneven height and strength; whereas in my improvement the bars *f*, or the metal pieces which hold together the front and back portions of the shell B and form the mortises, being in one single piece, enables me to enlarge the size of the spokes in the direction of each other in the immediate vicinity of the outer circumference of the annulus B to any desired extent not exceeding the distance between the spokes, and to leave the front and back portions of the annular shell B of uniform height and strength without adding weight of metal.

I am also aware that annular metal mortises similar in construction to the one I describe have been used in combination with a mortised wooden center; but I am not aware that it ever was used in combination with a grooved wooden hub prior to my invention.

Having thus described my invention, I claim as new and desire to secure by Letters Patent—

1. The combination of the grooved wooden center A with the metal shell B, having its front and back portions connected with the single bars *f*, in the manner substantially as set forth.

2. The combination of the grooved wooden center or core A, whether with parallel or inclined sides to the groove *g*, as described; the spokes E, whether with wedges inserted as described or otherwise; and the metal-mortise shell B, said shell being constructed substantially as and for the purposes set forth.

Witnesses: LATHROP DORMAN.
ELLIOT B. SUMNER,
GEO. W. MELONY.